United States Patent [19]

Gaskill et al.

[11] 4,042,003
[45] Aug. 16, 1977

[54] TIRE BEAD RETAINER

[75] Inventors: Gerald E. Gaskill, Farmington Hills, Mich.; James E. Woodlee, Kent, Ohio

[73] Assignee: The Goodyear Tire & Rubber Company, Akron, Ohio

[21] Appl. No.: 611,929

[22] Filed: Sept. 10, 1975

[51] Int. Cl.² ............................................. B60C 15/02
[52] U.S. Cl. ............................. 152/381.2; 152/379.1; 152/400
[58] Field of Search .................. 301/5 R, 38 R, 39 R, 301/39 T, 39 C, 95–98; 152/366, 401, 375, 377, 378, 379, 384–386, 393, 396, 399–401, 381 R, 381 A, 379.1, 400, 381.2

[56] References Cited

U.S. PATENT DOCUMENTS

| | | | |
|---|---|---|---|
| 1,939,095 | 12/1933 | Balfe | 152/366 |
| 2,198,978 | 4/1940 | Sauer | 152/381 A |
| 2,802,507 | 8/1957 | Clark | 152/401 |

FOREIGN PATENT DOCUMENTS 1,336,291 11/1973 United Kingdom ............... 152/399

*Primary Examiner*—Robert B. Reeves
*Assistant Examiner*—Charles A. Marmor
*Attorney, Agent, or Firm*—F. W. Brunner; P. E. Milliken; Frederick K. Lacher

[57] ABSTRACT

A tire bead retainer for mounting on a wheel rim in which a locking member is located adjacent a bead seat of the rim. The locking member is depressed by the beads during mounting of the tire on the rim and is moved back into the locking position for retaining the bead after the bead is seated in the bead seat. The bead retainer may be mounted on a rim prior to mounting of the tire and either the locking member or the complete retainer may be removable for removing the tire from the rim. Several retainers may be spaced around the wheel rim to engage the tire bead at several spaced-apart positions at one side of the rim.

15 Claims, 11 Drawing Figures

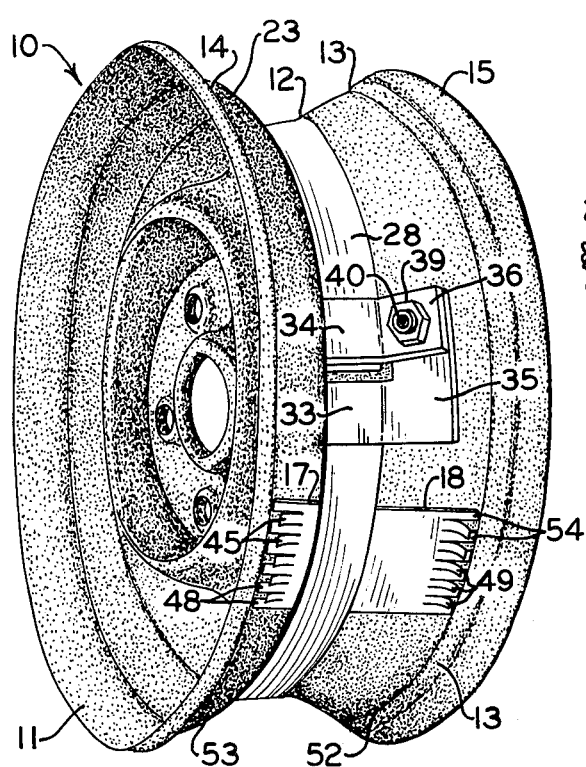
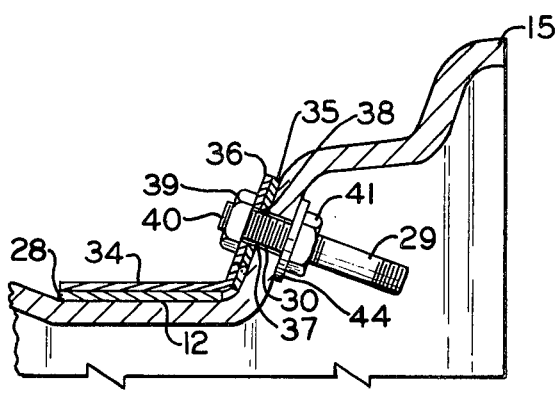
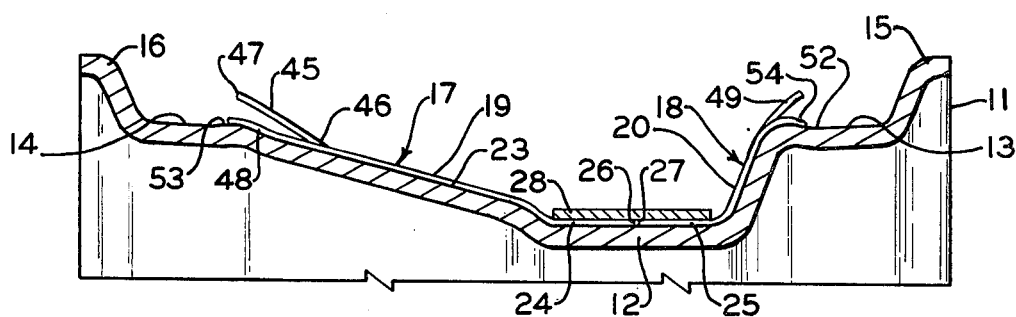
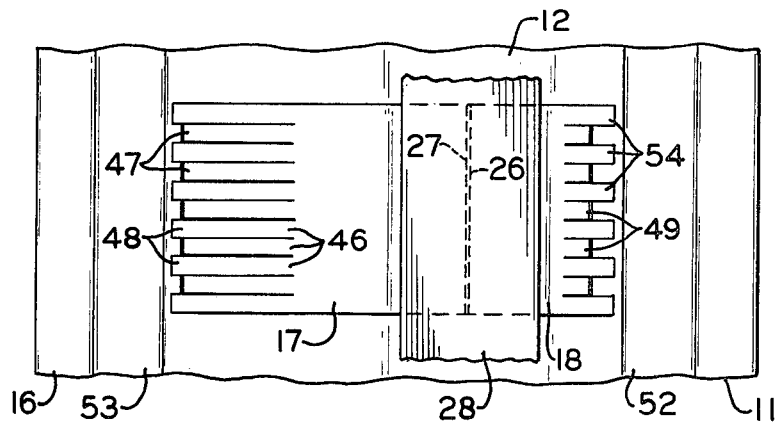
FIG - 1
FIG - 3
FIG - 2
FIG - 4

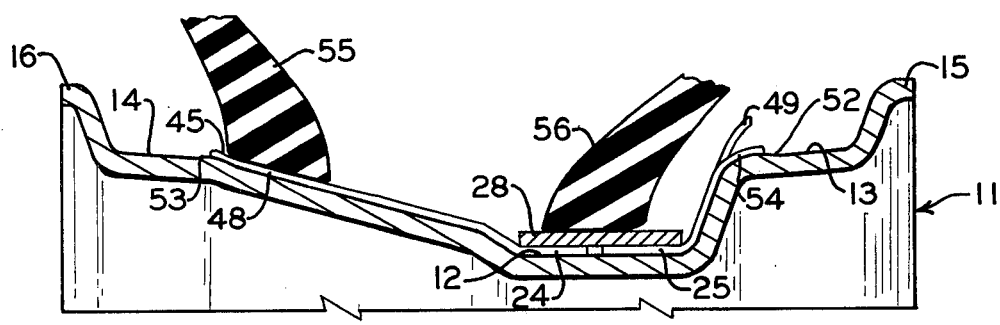
FIG-5
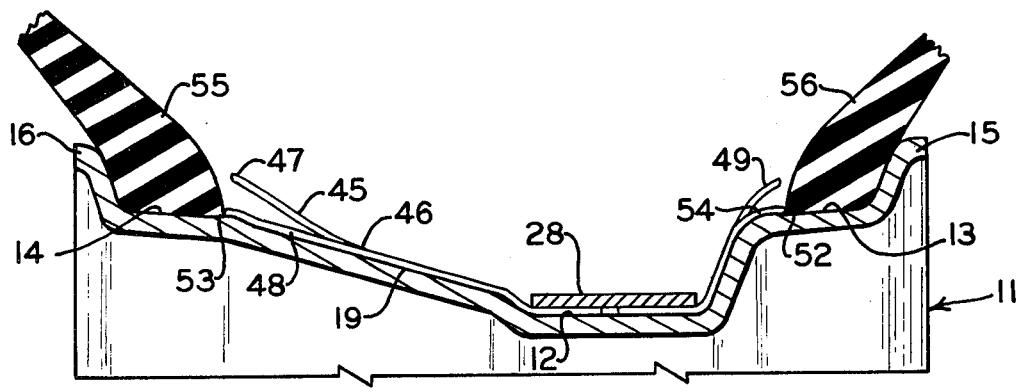
FIG-6
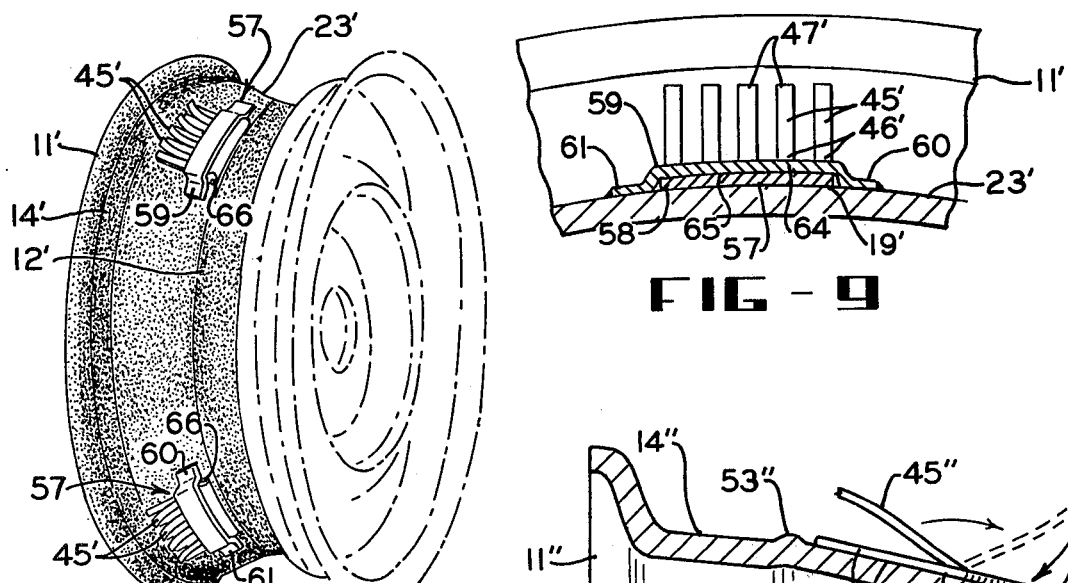
FIG-7
FIG-9
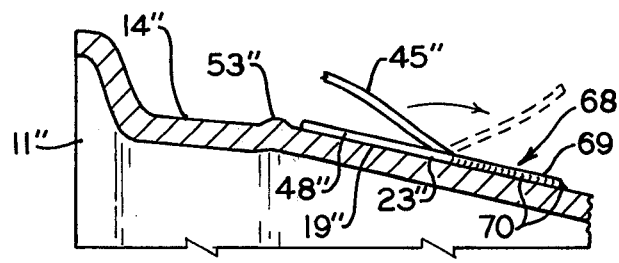
FIG-10

TIRE BEAD RETAINER

Heretofore bead retainers have been devised which could only be used with a split rim or which had to be assembled after the tire was mounted on the rim. These devices have not been readily adaptable for installation in new cars at auto assembly plants because they either could not be used with a drop center well type rim or required an additional assembly operation in the tire mounting area. Problems have also been encountered in the installation of these retainers on drop center rims by service stations and garages because of the training and special equipment needed.

It is a principal object of this invention to provide a tire bead retainer which can be mounted on a tire rim prior to mounting of the tire and will not interfere with mounting of the tire.

Another object is to provide a bead retainer adaptable for use on a drop center well type rim.

A further object is to provide for disassembly of the bead retainer prior to dismounting of the tire.

A still further object is to provide for resiliently extending a locking member into a locking position to retain a tire bead.

Another object is to provide for more than one locking member to retain the bead.

A further object is to provide for mounting the bead retainer on the rim at one side of a well of a drop center well type rim.

A still further object is to provide for attaching the bead retainer to the rim.

Another object is to provide for removing the locking member from the retainer prior to dismounting the tire.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a view in perspective of a wheel showing the tire bead retainer assembly mounted on the rim prior to mounting the tire on the rim.

FIG. 2 is an enlarged sectional view of the rim and bead retainer assembly taken along a radial plane extending through the retainer assembly.

FIG. 3 is a fragmentary sectional view of the bead retainer assembly, mounting band and valve taken along a radial plane through the valve assembly.

FIG. 4 is an enlarged side elevation of the wheel and bead retainer assembly shown in FIG. 1 with parts being broken away.

FIG. 5 is a section like FIG. 2 showing the beads of a tire in the process of being mounted on the rim.

FIG. 6 is a section like FIGS. 2 and 4 showing the beads of the tire in the fully mounted condition.

FIG. 7 is a view in perspective of a wheel showing a tire bead retainer assembly modification mounted on a surface of the rim at one side of the wheel well.

FIG. 9 is a fragmentary sectional view taken along the plane of line 9—9 in FIG. 8.

FIG. 10 is a fragmentary sectional view of a further modification taken along a radial plane extending through the retainer assembly.

Figure 8:
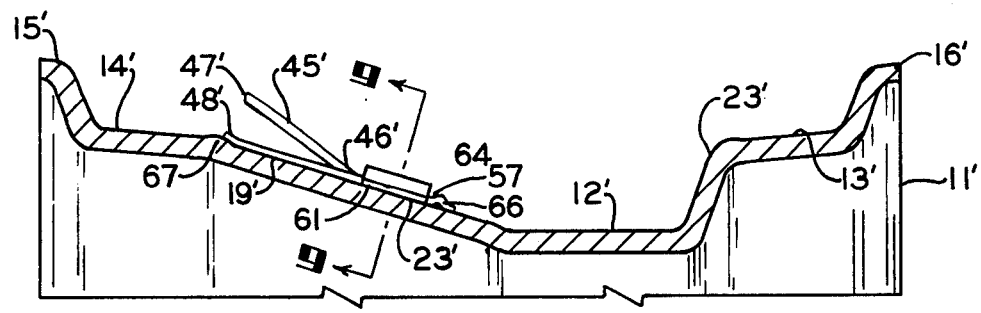
FIG. 8 is an enlarged sectional view of the retainer modification shown in FIG. 7 taken along a radial plane extending through the retainer assembly.

Referring to the drawings and particularly to FIG. 1 a wheel 10 for an automobile or other vehicle is shown having a drop center rim 11. As is further illustrated in FIG. 2 the rim 11 has an annular well 12 with bead seats 13 and 14 and flanges 15 and 16. The wheel 10 including the rim 11 are of a standard design for automobiles.

The tire bead retainer assembly mounted on the wheel 10 includes a tire bead retainer 17 extending from the bead seat 14 into the well 12 and a second tire bead retainer 18 extending from the bead seat 13 into the well 12. The bead retainers 17 and 18 shown in FIGS. 1, 2 and 4 are preferably of thin sheet metal such as steel sheet and have surfaces 19 and 20, respectively, which conform to radially outer surface 23 of the rim 11.

The bead retainers 17 and 18 have base portions 24 and 25 respectively located in the well 12 with abutting edges 26 and 27 respectively. A clamping band 28 of steel or other thin high strength material extends around the rim 11 in the well 12 and overlaps the base portions 24 and 25 of the bead retainers 17 and 18 to hold them in position on the rim 11.

As shown in FIGS. 1 and 3, a valve stem 29 extends through an opening 30 in the rim 11 and is utilized to hold the ends of the clamping band 29 together. In the present embodiment fastening angles 33 and 34 are secured to the ends of the clamping band 28 as by welding and have overlapping ears 35 and 36 respectively with aligned holes 37 and 38 through which the valve stem 29 extends. A nut 39 is threaded on inner end 40 of the valve stem 29 for engagement with the ear 36 of the angle 34. A second nut 41 is threaded on the valve stem 29 at a position outside the rim 11 and engages a sealing washer 44 interposed between the nut and the rim 11 to seal the space between the opening 30 in the rim and the valve stem 29. The ear 35 of the angle 33 is interposed between the ear 36 and the rim 11. By tightening the nut 39 at the inner end and the second nut 41 the ears 35 and 36 are clamped together which holds the ends of the clamping band 28 in tension and as shown in FIG. 2 clamps the base portions 24 and 25 of the bead retainers 17 and 18 against the rim 11.

Referring to FIG. 2 and 4 the bead retainer 17 has spring lock means in the form of spring fingers or tabs 45 attached to the base portion 24. The tabs 45 are positioned in parallel alignment and each locking member or tab has a first end 46 attached to the base portion 24 at a position at a a side of the well 12 and then slops radially and axially outward of the rim 11 to a second end 47 which is spaced radially outward from the plane of the surface 19 of the base portion 17. The second end 47 of spring tabs 45 on bead retainer 17 extends to a locking position adjacent an edge 53 of bead seat 14. A second set of supporting fingers or supporting tabs 48 are attached to the base portion 24 at positions between the spring tabs 45 and are located in the plane of the surface 19 so as to bear against the radially outer surface 23 of rim 11 and counteract the forces exerted by the spring tabs 45.

The bead retainer 18 has a similar construction to the bead retainer 17 with the exception that the base portion 25 does not extend out of the well 12 of the rim 11. As shown in FIGS. 2 and 4 spring tabs 49 extend from the base portion 25 at a position at the other side of the well 12 radially and axially outward of the rim 11 to an extended locking position spaced from the surface 23 of the rim at an edge 52 of bead seat 13. Supporting tabs 54 extend from the base portion 25 along the plane of the surface 20 of the bead retainer 18 to the edge 52 of the bead seat 13.

In this embodiment the bead retainers 17 and 18 are of a resilient material such as spring steel and the spring tabs 45 and 49 have a resiliency for returning to the extended position shown in FIGS. 2 and 6 after being depressed into the spaces between the supporting tabs 48 and 54.

The bead retainers 17 and 18 may be mounted on the wheel 10 prior to mounting of a tire on the rim 11 by positioning the base portions 24 and 25 of the retainers in the well 12 of the rim with edges 26 and 27 in abutting relationship as shown in FIG. 4. The clamping band 28 is then wrapped around the rim 11 in the well 12 and in overlapping relationship with the base portions 24 and 25 of the bead retainers 17 and 18. The ears 35 and 36 are positioned in overlapping relationship with the holes 37 and 38 in alignment with the valve opening 30 so that the valve stem 29 may be inserted through the holes and opening. The nut 39 which has one end abutting the surface of angle 34 is held in position against the ear 36 and the valve stem 29 is threaded in the nut. The sealing washer 44 is then placed over the valve stem 29 against the rim 11 and the nut 41 is threaded on the valve stem to hold the assembly together. It is understood that the bead retainers 17 and 18 may be placed at any suitable position around the circumference of the rim. Also additional pairs of bead retainers 17 and 18 may be located at spaced-apart positions around the circumference. In some cases only one bead retainer is desirable and this retainer can be installed at one side of the well 12 under clamping band 28.

With the bead retainers 17 and 18 clamped against the rim 11 by clamping band 29 the assembly is ready for mounting of a tire having beads 55 and 56 as shown in FIGS. 5 and 6. In accordance with the normal mounting procedure a portion of the bead 55 is placed in the well 12 whereupon the rest of the bead may be pulled over the flange 15 and then moved towards the rim flange 16 as shown in FIG. 5. A portion of the bead 56 is then placed in the well 12 and the rest of the bead pulled over the flange 15 into the well. During this operation the bead 55 is moved to the left as shown in FIG. 5 over the side of the well 12 and over the spring tabs 45 forcing them into the spaces between the supporting tabs 48. The bead 55 is then moved into the bead seat 14 and the spring tabs 45 resiliently snap back into the locking position as shown in FIG. 6. The other bead 56 is moved to the right as shown in FIGS. 5 and 6 over the other side of the well 12 and into the bead seat 13 and in the process depresses the spring tabs 49 which then spring back into the locking position as shown in FIG. 6.

In operation of the vehicle on which the wheel 10 is mounted the tire may be punctured or lose inflatable fluid or gas which normally holds the beads 55 and 56 againt the flagnes 15 and 16. With the loss of this inflation pressure the beads 55 and 56 may be urged in the direction of the well 12 due to turning of the vehicle or other road conditions. With the construction of this invention the beads 55 and 56 will contact the spring tabs 45 and 49 which will prevent any further movement of the beads out of the bead seats 13 and 14. This is important to maintain control of the vehicle and prevent the tire coming off the rim 11 which not only damages the tire but also may cause an accident.

When it is desired to remove the tire and the beads 55 and 56 from the rim 11 as shown in FIG. 6, the bead retainers 17 and 18 may be released. This is done by turning the nut 41 on the valve stem 29 to release the pressure on the sealing washer 44. The valve stem 29 is then turned relative to the nut 39 which is held against rotation by the land engaging the angle 34 until the valve stem 29 is screwed out of the nut releasing the ends of the clamping band 28. The clamping band 28 may be of a resilient material such as steel having a preinstallation diameter greater than the diameter of the well 12 of the rim 11 so that upon removal of the valve stem 29 the clamping band will spring away from the well and release the bead retainers 17 and 18. The bead retainers 17 and 18 will then separate and fall clear of the beads 55 and 56 so that the normal dismounting procedure for removing a tire from a drop center rim may be followed. The bead retainers 17 and 18 and the clamping band 28 may be used again on the same wheel 10 or another wheel.

Referring to FIGS. 7, 8 and 9, a further modification is shown in which bead retainers 57 are mounted on rim surface 23' at circumferentially spaced-part positions around the rim 11' of the wheel 10'. The bead retainers 57 may be spaced at sufficient circumferential intervals for retaining the bead of a tire in a bead seat 14' at on side of a wheel well 12' of the rim 11'. In this embodiment, the bead retainers 57 are spaced at intervals of 120°.

Each of the bead retainers 57 is the same and therefore the following description will be limited to one of the retainers but will apply to all three of the retainers. A base portion 58 of the retainer 57 has a surface conformable with the surface 23' of the rim 11'and is attached to the rim by a strap member 59 having ends 60 and 61 welded to the rim and a raised portion 64 providing a slot 65 through which the base portion may be inserted. The base portion 58 may have a crimped edge 66 extending towards the well 12' and located out of the slot 65 for preventing movement of the base portion through the slot towards the bead seat 14'.

At the other edge of the base portion 58, spring lock means in the form of spring fingers or spring tabs 45'are attached to the base portion. The tabs 45' are positioned in parallel alignment and each locking member or tab has a first end 46' attached to the base portion 58 and then slopes radially and axially outward of the rim 11' to a second end 47' which is spaced radially outward of the rim from the plane of the surface 19' of the base portion. The second ends 47' of tabs 45' on bead retainers 57 extend to a locking position adjacent an edge 53' of bead seat 14'. A set of supporting fingers or supporting tabs 48' are attached to the base portion 58 at positions between the spring tabs 45' and are located in the plane of the surface 19' so as to bear against the radially outer surface 23' of rim 11' and counteract the forces exerted by the spring tabs. The supporting tabs 48' also may bear against a rib 67 at the edge of the bead seat 14' to further hold the bead retainers 57 in position.

The bead retainers 57 may be mounted on the wheel 10' prior to mounting of a tire on the rim 11' by inserting the crimping edges 66 of the base portion 58 in the slots 65 under the strap members 59 until the crimped edges snap out of the slots. With the bead retainers 57 in position, a tire may be mounted on the rim 11' in accordance with the normal mounting procedure. Referring to FIGS. 7 and 8, the first bead of the tire is pulled over a flange 16' by placing a portion of the bead in the well 12' and then pulling the rest of the bead over the flange. This bead is then moved to the left as shown in FIGS. 7 and 8 over the bead retainers 57 whereupon the spring tabs 45' resiliently retract into the spaces between the supporting tabs 48'. After the bead is moved into the bead seat 14', the spring tabs 45' resiliently snap back into the locking position as shown in FIG. 8. The other bead of the tire may then be mounted by moving a portion of the bead into the well 12' and then pulling the rest of the bead over the flange 16' after which the bead is moved into the bead seat 13' by sliding it over the surface 23' of the rim 11' on the other side of the well 12'.

In operation of the vehicle on which the wheel 10' is mounted, the tire may be punctured or otherwise lose inflatable fluid or gas which normally holds the beads against the flanges 15' and 16'. With the loss of inflation pressure, the beads may be urged in the direction of the well 12'; however, the spring tabs 45' will prevent any further movement of the bead out of the bead seat 14' and this will prevent the tire from leaving the wheel 10'.

When it is desired to remove the tire and the beads from the rim 11', one of the beads may be moved out of the bead seat 13' into the well 12' and then pulled over the rim flange 16'. Access to the inside of the tire and to the bead retainers 57 is then possible and the spring tabs 45' may be removed by bending them outward away from the rim surface 23' in a clockwise direction as shown in FIG. 8. The spring tabs 45' are of a resilient material which will break upon bending beyond a predetermined amount and accordingly the tabs will break at the first end 46'. After the tabs 45' have been broken off, the other bead of the tire may be removed from the bead seat 14' over the bead retainers 57 into the well 12' and then over the rim flange 16'.

After the tire is removed from the rim 11', the used bead retainers 57 may be removed from the slots 65 under the strap members 59 and replacement bead retainers inserted in the slots making the rim ready for mounting of a repaired or replacement tire.

Figure 11:
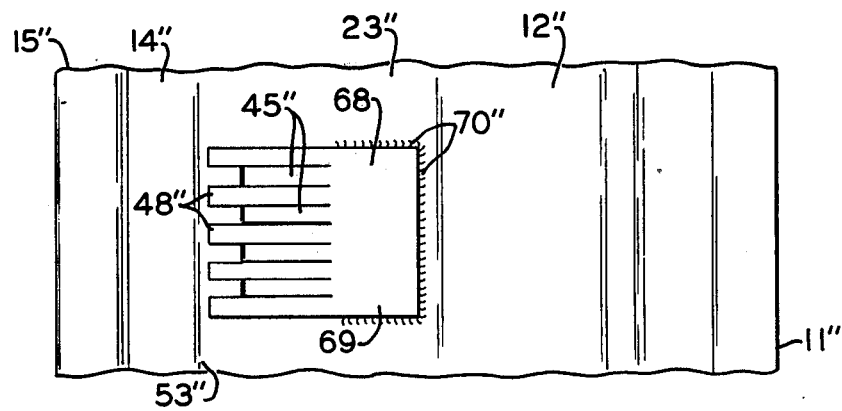
FIG. 11 is an enlarged side elevation of the wheel and bead retainer shown in FIG. 10 with parts being broken away.

Referring to FIGS. 10 and 11, a further modification is shown in which a bead retainer 68 has a base portion 69 which is welded to a surface 23" of a rim 11". The bead retainer 68 has spring tabs 45" attached to the base portion 69 and sloped radially and axially outward of the rim 11" to a locking position adjacent an edge 53" of a bead seat 14". A second set of supporting tabs 48" are attached to the base portion 69 at positions interposed between the spring tabs 45" and are located in the plane of the surface 19" so as to bear against the radially outer surface 23" of rim 11" and counteract the forces exerted by the spring tabs.

The bead retainer 68 may be mounted on the rim 11" prior to mounting of the tire by welding the base portion 69 to the rim at the edges 70. The tire may then be mounted in the same manner as described heretofore for the modification of FIGS. 7, 8 and 9. The bead seated in bead seat 14" will be held in position by the spring tabs 45" which prevent the tire from pulling off the rim 11" in the event of puncture or blowout.

The tire may be removed from the rim 11" in the same manner as described hereinabove for the modification of FIGS. 7, 8 and 9. The spring tabs 45" are broken off by bending them in a counterclockwise direction as shown in FIG. 10 after which the other bead of the tire may be removed.

While certain representative embodiments and details have been shown for the purpose of illustrating the invention it will be apparent to those skilled in the art that various changes and other modifications may be made therein without departing from the invention.

What is claimed is:

1. In combination with a wheel rim having an annular well and a bead seat axially spaced from said well at one side of said rim a tire bead retainer comprising a base portion for attachment to said rim in said well, said base portion having a surface conformable with said surface of said rim, a locking member mounted on said base portion for positioning on a side of said well and extending radially outward from the plane of said surface of said base portion to a locking position spaced from a surface of said rim, said locking member being retractable to a retracted position close to said surface and resilient means urging said locking member into locking position whereby a tire bead may be moved into said well and toward said side of said well over said base portion, said locking member being movable into the retracted condition by said bead during mounting of said tire and resiliently returned to said locking position after said bead has been moved onto said bead seat.

2. In combination a tire bead retainer according to claim 1 wherein said locking member and said resilient means comprise a spring finger having a first end attached to said base portion, said spring finger sloping radially outward to a second end of said finger at said locking position, said spring finger being progressively engageable by said bead between said first and said second ends to retract said finger during mounting of said tire, and said second end of said spring finger in said locking position being engageable with said bead to prevent movement across said rim.

3. In combination a tire bead retainer according to claim 2 wherein said locking member further comprises a plurality of spring fingers located in parallel alignment along one side of said base portion with said spring finger included, each of said spring fingers having a first end attached to said base portion and sloping radially outward to a second end at said locking position and said spring fingers being progressively engageable by said bead between the first and second ends to retract said spring fingers during mounting of said tire, and said second end of each of said spring fingers being engageable in said locking position with said bead to prevent movement of said bead across said rim.

4. In combination a tire bead retainer according to claim 3 wherein a plurality of supporting fingers are attached to said base portion at positions between said spring fingers, each of said supporting fingers being located in the plane of said surface of said base portion whereby said supporting fingers bear against said rim to support said retainer with said spring fingers in said locking position.

5. In combination with a rim having an annular well and a bead seat axially spaced from said well at one side of said rim tire bead retainer assembly comprising a bead retainer including a base portion for locating in said well and conformable with a surface of said rim in said well, spring lock means mounted on said base portion including a locking member for mounting on a side of said well and movable to a locking position spaced from a surface of said rim and to a retracted position close to said surface, resilient means for urging said locking member into said locking position, an elongated band of flexible material having a width not greater than the width of said well permitting radial movement of said band into said well, means for connecting space-apart positions on said band for wrapping said band around said rim in said well and said band being adapted for positioning over said base portion for clamping said retainer on said rim whereby a tire may be mounted on said rim by positioning a first bead in said well, moving said bead axially toward said side of said well and over said band and said retainer with said locking member being moved into a retracted position by said bead during the axial movement and said locking member being resiliently returned to said locking position after said bead has been moved into said bead seat.

6. In combination with a rim having a second bead seat on the opposite side of said well from said bead seat, a tire bead retainer assembly according to claim 5 having a second bead retainer with a second base portion for positioning in said well between said clamping band and said rim, said second bead retainer having a second spring lock means mounted on said second base portion including a second locking member for mounting on a second side of said well and movable into a second locking position spaced from a surface of said rim and to a retracted position close to said surface and a second resilient means for urging said second locking member into said second locking position whereby a second bead of said tire may be positioned in said well after said first bead has been moved axially in one direction out of said well and moved axially toward said second side of said well over said band and said second bead retainer with said second locking member being movable into a retracted position by said second bead during the axial movement and being resiliently returned to said second locking position after said second bead has been moved into said second bead seat.

7. In combination a tire bead retainer assembly according to claim 5 wherein said rim has an opening and said means for connecting spaced-apart positions on said band is extendable through said opening for releasing the connection and said retainer from the clamped position under said band.

8. In combination a tire bead retainer assembly according to claim 7 wherein said opening is a tire valve opening and said means for connecting spaced-apart positions on said band includes a tire valve stem removably mountable in said opening.

9. In combination a tire bead retainer assembly according to claim 8 wherein said spaced-apart positions are at the ends of said band and angle members are fastened to the ends, said angle members having overlapping ears with openings alignable with said opening in said rim for insertion of said valve stem through said ears and said rim in the connected condition.

10. A tire bead retainer and rim assembly comprising a rim having an annular well and tire bead seats axially spaced from and on opposite sides of said well, said well having surfaces over which beads of a tire can slide between said well and said bead seats, a first bead retainer mounted on one side of said well on one of said surfaces at the edge of one of said bead seats, said bead retainer including a locking member mounted on said retainer at said one side of said well, said locking member being movable to a locking position spaced from said one of said surfaces of said well and to a retracted position close to said one of said surfaces and resilient means urging said locking member into said locking position whereby the locking member is moved into the retracted position by one of said beads being moved into said well and toward said one side of said well during mounting of the tire and resiliently returned to the locking position after the bead has been moved past the locking member onto the bead seat on said one side of said well for engaging the bead upon movement out of the bead seat.

11. A tire bead retainer and rim assembly according to claim 10 wherein a second bead retainer is mounted on said one side of said well on said one of said surfaces at the edge of said one of said bead seats, said second bead retainer including a second locking member mounted on said second bead retainer at said one side of said well, said second locking member being movable to a locking position spaced from said one of said surfaces of said well and to a retracted position close to said one of said surfaces and resilient means urging said second locking member of said second retainer into said locking position and said second bead retainer being spaced circumferentially from said first bead retainer for engaging different portions of the bead upon movement out of the bead seat.

12. A tire bead retainer and rim assembly according to claim 10 wherein said bead retainer has a base portion with a surface conformable with said surface of said well, said locking member being mounted on said base portion and means for attaching said base portion to said rim.

13. A tire bead retainer and rim assembly according to claim 12 wherein said means for attaching said base to said rim includes a strap member with the ends fastened to said rim, said strap member having a raised portion between said ends providing a slot between said strap member and said rim for insertion of said base portion and said base portion having a projection on the edge extending out of said slot for holding said retainer in position after insertion under said strap member.

14. A tire bead retainer and rim assembly according to claim 12 wherein said means for attaching said base member to said rim includes welding of the edges of said base member to said rim surface.

15. A tire bead retainer and rim assembly according to claim 12 wherein said locking member and said resilient means comprise a spring finger having a first end attached to said base portion, said spring finger sloping radially outward to a second end of said finger at said locking position, said spring finger being progressively engageable by said bead between said first and said second ends to retract said finger during mounting of said tire, said second end of said spring finger in said locking position being engageable with said bead to prevent movement of the bead out of said bead seat and said spring finger having the property of breaking off at said first position upon lifting of said finger away from said one of said surfaces of said rim to remove said finger and thereby permit sliding movement of the bead over said one of said surfaces into said well for removing the tire from the rim.

* * * * *